United States Patent
Abe et al.

(10) Patent No.: US 8,469,161 B2
(45) Date of Patent: Jun. 25, 2013

(54) FRICTION COUPLE

(75) Inventors: Kenji Abe, Toyota (JP); Masaaki Nishiwaki, Mishima (JP); Hiroshi Isono, Mishima (JP); Hiroyuki Fujikawa, Nagoya (JP); Satoshi Wakamatsu, Nagoya (JP); Yoshio Shimura, Aichi-ken (JP); Yuji Nagasawa, Seto (JP)

(73) Assignees: Toyota Jidosha Kabushiki Kaisha, Toyota-shi (JP); Advics Co., Ltd., Kariya (JP)

( * ) Notice: Subject to any disclaimer, the term of this patent is extended or adjusted under 35 U.S.C. 154(b) by 929 days.

(21) Appl. No.: 12/576,528

(22) Filed: Oct. 9, 2009

(65) Prior Publication Data

US 2010/0163353 A1 Jul. 1, 2010

(30) Foreign Application Priority Data

Oct. 10, 2008 (JP) ................. 2008-263945

(51) Int. Cl.
*F16D 69/02* (2006.01)
(52) U.S. Cl.
USPC ................. 188/251 M; 188/251 A
(58) Field of Classification Search
USPC ................. 188/250 R, 251 R, 251 A, 251 M, 188/255
See application file for complete search history.

(56) References Cited

U.S. PATENT DOCUMENTS

| 2,581,941 A * | 1/1952 | Shinn et al. ............... 188/251 A |
| 7,264,094 B2 * | 9/2007 | Okayama ................ 188/218 XL |
| 2005/0211513 A1 * | 9/2005 | Okayama et al. .......... 188/251 A |

FOREIGN PATENT DOCUMENTS

| CN | 1178252 A | 4/1998 |
| JP | 8-254236 | 10/1996 |
| JP | 2007-71220 | 3/2007 |

OTHER PUBLICATIONS

Chinese Office Action issued Jul. 11, 2011, in Patent Application No. 200910204645.6 (with English-language translation).

* cited by examiner

*Primary Examiner* — Thomas J Williams
(74) *Attorney, Agent, or Firm* — Oblon, Spivak, McClelland, Maier & Neustadt, L.L.P.

(57) ABSTRACT

A friction couple including: a first friction member that contains a metallic material and includes a first friction surface; and a second friction member that includes a second friction surface that contacts the first friction surface and that contains an oxidation film developer that accelerates formation of an oxidation film on at least one of the first friction surface and the second friction surface by oxidizing the metallic material when the first friction surface and the second friction surface contact each other.

14 Claims, 3 Drawing Sheets ific
FRICTION COUPLE

INCORPORATION BY REFERENCE

The disclosure of Japanese Patent Application No. 2008-263945 filed on Oct. 10, 2008 including the specification, drawings and abstract is incorporated herein by reference in its entirety.

BACKGROUND OF THE INVENTION

1. Field of the Invention

The present invention relates to a friction couple in which a friction surface that preferably suppresses noise and vibration is stably formed and maintained.

2. Description of the Related Art

Friction couples for automobiles and machine tools, which include a friction member for a clutch and a brake with a sliding member, require various capabilities. Especially, for developing a more effective clutch or brake, search for the material that does not cause noise or vibration in operation has been conducted.

One of the reasons that cause noise and vibration is nonuniform abrasion on the sliding member of the friction couple. As one of the methods for suppressing such vibration, nonuniform abrasion is suppressed by reducing aggression of the friction member against the sliding member. For the less aggressive friction member, there could be for example a friction member from which an aggressive material is reduced or a friction member to which a soft material such as rubber is added. However, the friction member, from which an aggressive material is reduced, is faced with the problem that the friction coefficient lowers. Also, the friction member with rubber suppresses the aggression of the material that attacks the sliding member by the elastic force of the rubber, but the rubber material deteriorates altered when the temperature rises. Unfortunately, due to the alteration of the rubber material, the suppression of aggression against the sliding member cannot be maintained for an extended period of time, and at the same time that the friction coefficient is reduced by the decomposed matter.

Japanese Patent Application Publication No. 2007-71220 (JP-A-2007-71220) discloses the technique that suppresses the vibration during friction caused by the above reasons. The technique of JP-A-2007-71220 relates to a friction couple that includes: a friction member that includes a fiber base material, a friction-regulating agent, a bonding agent, and a copper oxide; and a sliding member whose entire body or at least surface of the body is made of iron material. The inventor of the disclosed application JP-A-2007-71220 considers that, with such a friction member and a sliding member provided in the friction member, when the friction member and the sliding member slidingly contact each other, copper oxide and iron are reacted to produce a protective film on the surface of the sliding member, and thus the aggression of the friction member against the sliding member is reduced and nonuniform abrasion of the sliding member is suppressed. Unfortunately, the friction member of the friction couple of JP-A-2007-71220, which is produced by adding copper oxide to the non-iron material, has difficulty in forming and maintaining a protective film on the metal surface of the sliding member depending on the operating condition, pressure, speed, and temperature during friction.

SUMMARY OF THE INVENTION (US)

The present invention provides a friction couple in which a friction surface for preferably suppressing noise and vibration is stably formed and maintained.

A first aspect of the present invention is a friction couple including: a first friction member that contains a metallic material and includes a first friction surface; and a second friction member that includes a second friction surface to contact the first friction surface and that contains an oxidation film developer to accelerate formation of an oxidation film on at least one of the first friction surface and the second friction surface by oxidizing the metallic material when the first friction surface of the first friction member and the second friction surface of the second friction surface contact each other.

According to the friction couple structured as described above, even in the case that the oxide film on the friction surface cannot spontaneously be formed because of certain operating condition, pressure, speed, or temperature during friction, the second friction member contains the oxide film developer, so that the oxide film that preferably suppresses noise and vibration can be effectively formed and maintained on the friction surface of at least one of the first and second friction members.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A first aspect of the present invention is a friction couple including: a first friction member that contains a metallic material and includes a first friction surface; and a second friction member that includes a second friction surface to contact the first friction surface and that contains an oxidation film-developing medium to accelerate formation of an oxidation film on at least one of the first friction surface and the second friction surface by oxidizing the metallic material when the first friction surface of the first friction member and the friction surface of the second friction surface contact each other.

In the first aspect of the present invention, when the friction surface of the first friction member and the friction surface of the second friction member contact each other, electrons are removed at least from the friction surface of the first friction member, and the constituent substance of the friction surface is oxidized, and accordingly a film is formed on the friction surface. This film is called "oxide film". The noise and vibration caused in the friction couple is due to torque variation. The oxide film of the first aspect of the present invention suppresses the torque variation by homogenizing the friction coefficient in the friction surface and by smoothing the friction surface. Accordingly, the noise and vibration can be suppressed. That is, firstly by forming the film on the entire friction surface, the friction coefficient of the surface become uniform. And secondly by forming the film on the entire friction surface, the friction surface is prevented from being partially corroded or removed into an uneven shape.

The metallic material may be iron or an iron compound. The friction couple structured in this way can form an iron oxide film that preferably suppresses noise and vibration at least on the friction surface of the first friction member.

Figure 1:
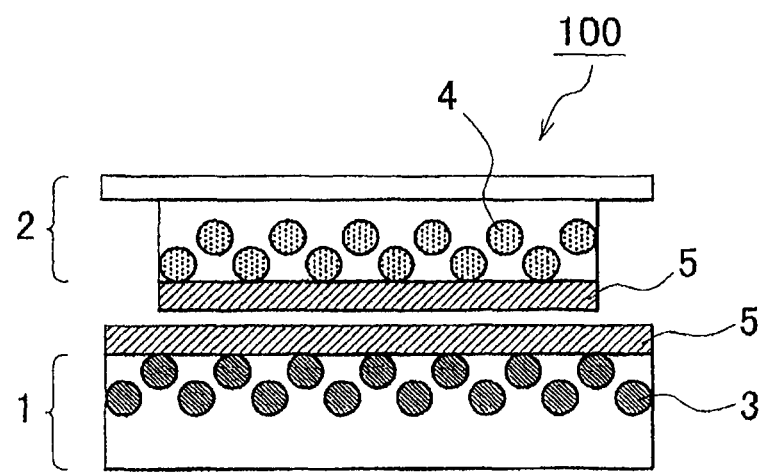
FIG. 1 is a schematic cross sectional view of a typical example of the present invention.

FIG. 1 is a schematic cross sectional view of a typical example of the present invention. The friction couple 100 includes a first friction member 1 and a second friction member 2, each of which has a friction surface that contacts one another. The friction member 1 contains a metallic material 3. The friction member 2 contains an oxide film-developing medium 4. The oxide film-developing medium 4 may be a component that is included in the friction member 2 or may be a structure of the friction member 2. The oxide film-developing medium 4 may include two or more kinds of components or structures. The friction surface of the friction member 1 and the friction surface of the friction member 2 contact each other, and then the metallic material 3 in the friction member 1 is oxidized by using the oxide film-developing medium 4 in the friction member 2. Accordingly, the oxide film 5 is formed on both friction surfaces of the friction member 1 and the friction member 2. The present invention is not necessarily limited to the typical example that is shown in FIG. 1. For example, the friction couple of the present invention may exert its effect by forming the oxide film on one of the friction surface of the first friction member and the friction surface of the second friction member.

The friction couple of the first embodiment of the present invention may be structured that the second friction member contains, as the oxide film-developing medium, at least one of a single metallic element and a metallic compound that are less likely oxidized than the metallic material.

The single metallic element and the metallic compound that are less likely oxidized than the metallic material (hereinafter referred to as "oxidation reaction developing substance") remove electrons from the metallic atom in the metallic material, during friction, rather than letting the oxidation reaction developing substance itself be oxidized. Accordingly, the metallic material, in which electrons are removed by the oxidation reaction developing substance, is oxidized and forms the oxide film on the friction surface. Here, the single metallic element and metallic compound that are less likely oxidized than the metallic material are both a substance that includes a metallic atom. In the first embodiment of the present invention, among the single metallic elements and metallic compounds, only one kind may be used, or two or more kinds may be mixed and used.

The oxidation reaction developing substance may preferably be contained 0.1 to 80 vol %. Because, when the oxidation reaction developing substance is less than 0.1 vol %, the oxidation effect of the metallic material cannot be obtained sufficiently. When the oxidation reaction developing substance is more than 80 vol %, the material strength becomes insufficient for a friction member. The oxidation reaction developing substance may preferably be contained 1 vol % or more, and more preferably be contained 3 vol % or more. The oxidation reaction developing substance may preferably be contained 50 vol % or less, and more preferably be contained 30 vol % or less.

The oxidation reaction developing substance may be a single metallic element that is selected from at least one of copper, tin, cobalt, indium, iridium, silver, bismuth, gold, platinum, rhodium, and palladium. Because, when the single metallic element has a lower ionization tendency than iron, the oxidation of the metallic material can be accelerated. Here, "lower ionization tendency than iron" means that the tendency to release electrons in order to be ionized is less than that of iron. More specifically, the oxidation reaction developing substance, which has a higher standard oxidation-reduction potential (standard electrode potential) than iron, has a lower ionization tendency than iron. The standard oxidation-reduction potential (standard electrode potential) may be referred to the standard hydrogen electrode potential described in Rika Nenpyo (Chronological Scientific Tables, 2008 edition, page 496, MARUZEN. CO., Ltd.).

The oxidation reaction developing substance may be a metallic compound that includes at least one of copper, tin, cobalt, indium, iridium, silver, bismuth, gold, platinum, rhodium, and palladium. Because, when the metallic compound has a lower ionization tendency than iron, the oxidation of the metallic material can be accelerated.

Figure 2:
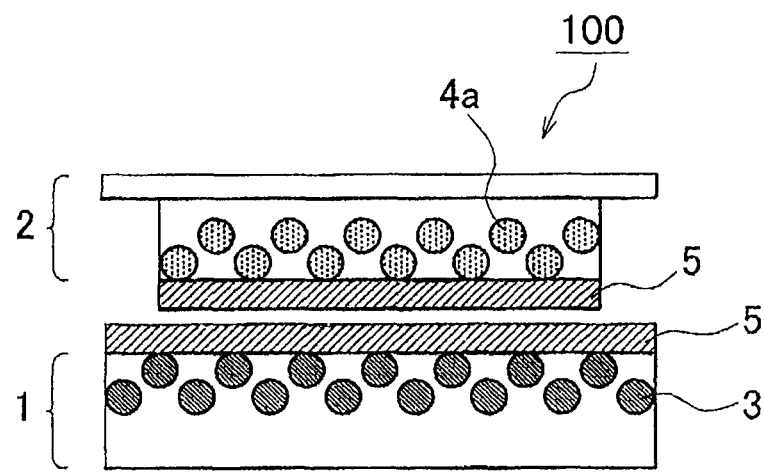
FIG. 2 is a cross sectional view that shows a first embodiment of the present invention.

FIG. 2 shows a schematic cross sectional view of the friction couple of the first embodiment. The friction couple 100 of the first embodiment includes a first friction member 1 and a second friction member 2, each of which has a friction surface that contacts one another. The frictional member 1 contains a metal material 3. The friction member 2 contains an oxide reaction developing substance 4a. Specifically, the substance 4a may be one of the single metallic element or the metallic compound. The substance 4a may include two or more kinds of substances. The friction surface of the friction member 1 and the friction surface of the friction member 2 contact each other, and then the metal material 3 is oxidized by using the substance 4a. Accordingly, the oxide film 5 is formed on both surfaces of the friction member 1 and the friction member 2.

With the friction couple of this embodiment, the single metallic element or the metallic compound in the second frictional member, which is less likely to be oxidized than the metallic material, removes electrons from the metallic atom in the metallic material in the first friction member during friction, so that the oxide film can effectively be formed and maintained on at least one of the friction surfaces of the first friction member and the second friction member.

In the second embodiment of the friction couple of the present invention, the second friction member may include, as the oxide film-developing medium, two or more metallic oxides that include the same metallic atoms whose oxidation numbers are different.

The metallic atoms whose oxidation numbers are different may be partially included in the metallic oxide, and need not be included entirely. Accordingly, a combination of a-$Fe_2O_3$ (including trivalent iron atom) and $Fe_3O_4$ (including both of trivalent iron atom and bivalent iron atom) described later is included in the combination of metallic oxides of the present embodiment.

Two or more metallic oxides that include the same metallic atoms whose oxidation numbers are different generally have different friction coefficients. For example, besides the combination of a-$Fe_2O_3$ and $Fe_3O_4$, there may be a combination of $Cu_2O$ (including univalent copper atom) and CuO (including bivalent copper atom), and a combination of $Ag_2O$ (including univalent silver atom) and AgO (including bivalent silver atom). By arranging such a combination of oxides each having a different friction coefficient on the friction surface, regardless of the oxidation state or the reduction state of the friction surface, a balance of oxidation-reduction reaction between the different oxides is maintained, and the metallic oxides containing the metallic atoms with different oxidation numbers (both of the oxidation state and the reduction state) can always be kept in certain proportion. Accordingly, the oxidation film with a predetermined friction coefficient can be maintained.

Figure 3:
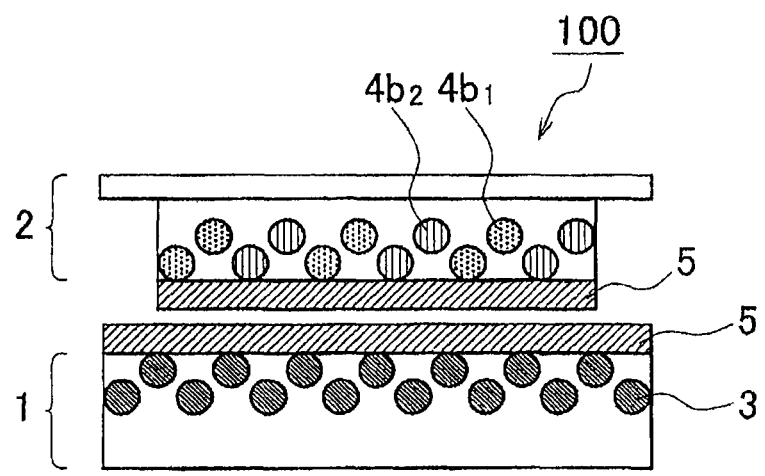
FIG. 3 is a cross sectional view that shows a second embodiment of the present invention.

FIG. 3 shows a schematic cross sectional view of the friction couple of the second embodiment. The friction couple 100 of the second embodiment includes a first friction member 1 and a second friction member 2, each of which has a friction surface that contacts one another. The frictional member 1 includes a metal material 3. The friction member 2 contains a first metallic oxide $4b_1$ and a second metallic oxide $4b_2$. Specifically, the substances $4b_1$ and $4b_2$ may be one of the combinations of the metallic compounds described above. When the friction surface of the friction member 1 and the friction surface of the friction member 2 contact one another, an oxidation film 5 is formed on both friction surfaces of the friction member 1 and the friction member 2. A proportion between the metallic atoms with different oxidation numbers, which are contained in the oxidation film 5, is always maintained in a fixed value regardless of the oxidation state and the reduction state.

The second friction member may contain a-$Fe_2O_3$ and/or $Fe_3O_4$ as the oxidation film-developing medium. The iron oxide a-$Fe_2O_3$ contains a trivalent iron atom, has a friction coefficient of 0.9, and is very hard. The iron oxide $Fe_3O_4$ contains both of a bivalent atom and a trivalent atom, has a friction coefficient of 0.4, and is less aggressive against the sliding member than a-$Fe_2O_3$. Thus, when the second friction member contains a-$Fe_2O_3$ and/or $Fe_3O_4$, the proportion of iron atoms with different oxidation numbers can always be maintained in a fixed value regardless of whether the friction surface is in the oxidation state or the reduction state.

As the second friction member contains two or more metallic oxides that includes the same metallic atoms whose oxidation numbers are different, the friction couple of the present embodiment can maintain a fixed proportion between the atoms with different oxidation numbers and thus maintain the friction coefficient in a fixed value regardless of the oxidation state or the reduction state.

In the third embodiment of the friction couple of the present invention, the metallic material may be iron or an iron compound, and the second friction member may include, as the oxide film-developing medium, a substance that has a stronger tendency to be negatively charged than iron.

Here, "a substance that has a stronger tendency to be negatively charged than iron" is a substance with an atomic or molecular structure that tends to receive electrons more than iron. For example, the substances mentioned here are listed below Steel of the triboelectric series in the military handbook (page 26, MIL-HDBK-263BAPPENDIXA). The table 1 below is extracted from the above cited reference.

TABLE 1

| Positive + | Human hands |
| --- | --- |
| | Rabbit fur |
| | Glass |
| | Mica |
| | Human hair |
| | Nylon |
| | Wool |
| | Fur |
| | Lead |
| | Silk |
| | Aluminum |
| | Paper |
| | Cotton |
| | Steel |
| | Wood |
| | Amber |
| | Sealing wax |
| | Hard rubber |
| | Nickel, copper |
| | Brass, silver |

TABLE 1-continued

| | Gold, platinum |
| --- | --- |
| | Sulfur |
| | Acetate rayon |
| | Polyester |
| | Celluloid |
| | Orlon ® |
| | Polyurethane |
| | Polyethylene |
| | Polypropylene |
| | PVC (vinyl) |
| | KEL F ® |
| Negative − | Silicon |
| | Teflon ® |

The note below the page 26 of the above cited reference describes that the order of the triboelectric series is changed according to the various factors. However, description of the present embodiment is made along with the table 1 shown above.

The substance that has a stronger tendency to be negatively charged than iron may be at least one of copper, platinum, silicon, silver, sulfur, polyethylene, polypropylene, polyurethane, rayon, polyester, and vinyl resin. Because, by using the substance that has a stronger tendency to be negatively charged than iron in the triboelectric series as the oxidation film-developing medium, the substance that has a stronger tendency to be negatively charged than iron can more easily remove electrons from the metallic atom in the metallic material in the first friction member during friction. Accordingly, the metallic material (iron or iron compound) can be oxidized in order to accelerate the formation of the oxidation film and to maintain the oxidation film.

Figure 4:
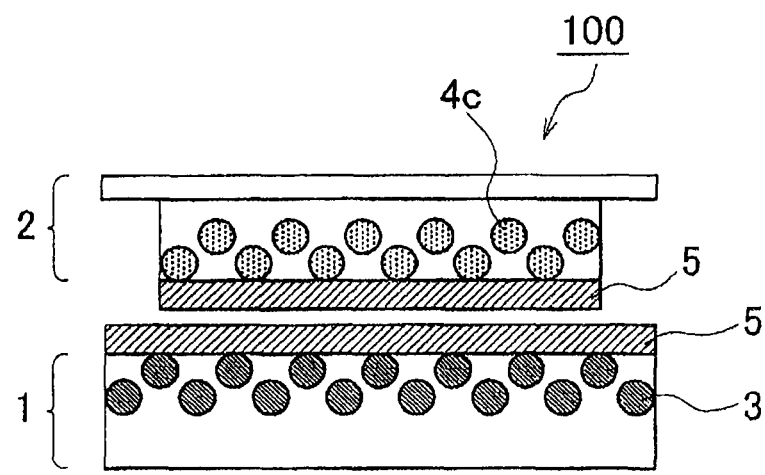
FIG. 4 is a cross sectional view that shows a third embodiment of the present invention.

FIG. 4 shows a schematic cross sectional view of the friction couple of the third embodiment. The friction couple 100 of the third embodiment includes a first friction member 1 and a second friction member 2, each of which has a friction surface that contacts one another. The frictional member 1 includes iron or an iron compound as a metal material 3. The friction member 2 contains a substance $4c$ that has a stronger tendency to be negatively charged than iron. The substance $4c$ may be one of the substances that have a stronger tendency to be negatively charged than iron described above. In order to obtain the effect of the present embodiment, the friction surface of the friction member 1 and the friction surface of the friction member 2 contact each other, and then the metal material 3 is oxidized by using the substance $4c$. Accordingly, the oxide film 5 is formed on both friction surfaces of the friction member 1 and the friction member 2.

In the friction couple of the present embodiment, the second friction member contains the substance that has a stronger tendency to be negatively charged than iron, so that the substance that has a stronger tendency to be negatively charged than iron can easily remove electrons from the metallic atom (i.e. iron atom) in the metallic material in the first friction member. Accordingly, the metallic material (iron or iron compound) can be oxidized in order to accelerate the formation of the oxidation film and to maintain the oxidation film.

In the friction couple of the fourth embodiment of the present invention, the second friction member may contain a substance that acts as an oxidation catalyst by friction as the oxidation film-developing medium.

Here, "oxidation catalyst" is a substance that accelerates oxidation reaction of the metallic material in the first friction member. "Substance that acts as an oxidation catalyst by friction" is a substance that accelerates the oxidation reaction of the metallic material in the first friction member by removing electrons from the metallic material by friction.

The second friction member may contain, as a substance that acts as an oxidation catalyst by friction, at least one of $TiO_2$, $BaTiO_3$, $ZrO_2$, and p-type semiconductor. Because, when the second friction member contains the catalyst that removes electrons from the metallic material by friction, the oxidation catalyst in the second friction member oxidizes the metallic material in the first friction member during friction. As a result, formation of the oxidation film can be further accelerated.

Figure 5:
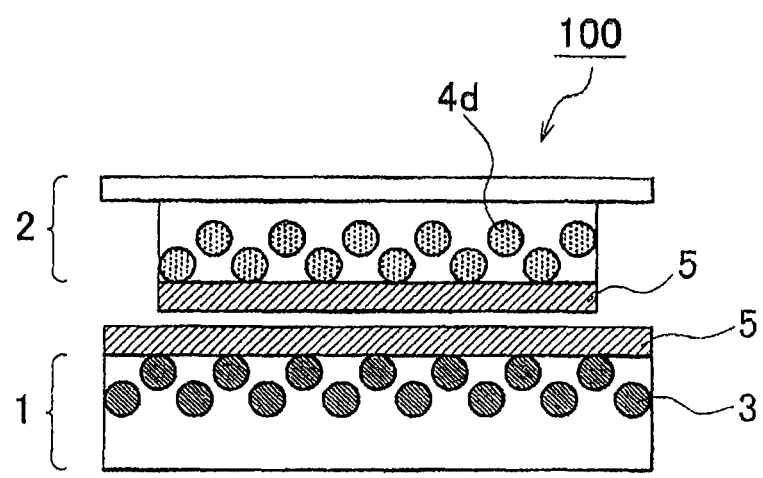
FIG. 5 is a cross sectional view that shows a fourth embodiment of the present invention.

FIG. 5 shows a schematic cross sectional view of the friction couple of the fourth embodiment. The friction couple 100 of the fourth embodiment includes a first friction member 1 and a second friction member 2, each of which has a friction surface that contacts one another. The frictional member 1 contains a metal material 3. The friction member 2 includes a substance 4d that acts as an oxidation catalyst by friction. Specifically, the substance 4d may be one of the substances described above. In order to obtain the effect of the present invention, the friction surface of the friction member 1 and the friction surface of the friction member 2 contact each other, and then the metal material 3 is oxidized by using the substance 4d. Then, the oxide film 5 is formed on both friction surfaces of the friction member 1 and the friction member 2.

In the friction member with such a structure, the substance that acts as the oxidation catalyst in the second friction member removes electrons from the metallic atoms in the metallic material in the first friction member, so that the formation of the oxidation film can be accelerated and the oxidation film can be maintained.

The present invention is not necessarily limited to the typical example and the four embodiments described above. For example, as a variation of the friction couple of the present invention, one end of the first friction member may electrically be connected to the second friction member as an external load, and the second friction member may operate electrically in order to remove electrons from the first friction member. Such a friction member can oxidize the metallic material in the first friction member to form the oxidation film by removing electrons from the first friction member.

Hereinafter, description is made of specific materials that form the friction couple of the first aspect of the present invention. The first friction member of the friction couple of the first aspect includes a metallic material or a composite material including a metallic material. The proportion of the metallic material or the composite material to the first friction member is preferably 10% or more by volume.

For a metallic material, a steel material such as cast iron, cast steel, stainless steel, and heat resistant steel, and heat resistant superalloy such as cobalt base alloy and nickel base alloy may be used. The metallic material may be retained in the form of bulk body by way of casting or sintering, or may be formed its surface layer by way of flame gunning, wet plating, or dry plating, or may be formed into the shape of the material from a rolled material by way of machining such as cutting work and deformation work, and then tightened by welding, riveting, screwing, and the like.

The composite material including a metallic material may include fibers or particles of steel and stainless steel and the like, and particles of cobalt base alloy and nickel base alloy. The fibers and particles of these may be combined with organic polymer. Besides the metallic material, the composite material may include for a filler, organic fibers such as aramid, organic particles such as cashew dust, inorganic fibers such as ceramic and glass, inorganic particles such as barium sulfate, and solid lubricant such as graphite and molybdenum.

The second friction member of the friction couple in the first aspect of the present invention is a composite material that is made by combining a sliding material such as a frictional wear regulator and the oxidation film-developing medium with a basic material by using organic polymer as a binder.

The material which is not thermally deformed is used preferably as the basic material. Specifically, organic fibers such as aramid and cellulose, and inorganic fibers such as steel, stainless steel, ceramic, glass and rock wool may be used. The proportion of the basic material to the second friction member is preferably 5 to 50% by volume.

The filler in the sliding material may include, for example, an organic filler such as aramid, cashew dust and rubber particle, an inorganic filler such as carbon, ceramic fiber, barium sulfate and calcium carbonate, metal powder such as iron powder and aluminum power, a ceramic filler such as oxide, nitride and carbide, and a solid lubricant such as graphite and molybdenum disulfide. The proportion of the filler to the second friction member is preferably 10% or more by volume.

For a binder in the sliding member, for example, phenolic resin, cashew resin, melamine resin and synthetic rubber may be used. The proportion of the binding agent to the second friction member is preferably 10% or more by volume.

According to the first aspect of the present invention, even in the case that the oxide film on the friction surface cannot spontaneously form because of certain operating condition, pressure, speed, or temperature during friction, the second friction member contains the oxide film-developing medium, so that the oxide film that preferably suppresses noise and vibration can be effectively formed and maintained on the friction surface of at least one of the first friction member and the second friction member.

Based on the fifth embodiment described below, the first aspect of the present invention is described while referring to a comparative example.

1. Manufacture of the Friction Couple

[Fifth embodiment] The second friction member (brake pad) was manufactured by mixing the materials shown in the table 2 with a proportion (vol %) of the embodiment column in the table 2. In the second friction member of the fifth embodiment, 5 vol % of tin was included as an oxidation film developing medium. For the detail of the manufacturing process, firstly, raw materials were evenly mixed for five minutes by an upright mixer in order to obtain a mixture of friction member materials. Secondly, the mixture of friction member materials were put into the die that has heated at 150° C., and thermoforming was carried out for 10 minutes under a pressure of 200 kg/cm$^2$. Then, curing was carried out for two hours at the temperature of 200° C. in order to obtain the second friction member. For a first friction member (disc rotor), a cast iron rotor (FC200, which is defined by the Japanese Industrial Standard G5501, or equivalent) was used. The first friction member and the second friction member were set together in order to obtain the friction couple of the fifth embodiment.

COMPARATIVE EXAMPLE

A first friction member (disc rotor) manufactured in the same way as the fifth embodiment and a second friction member (brake pad) manufactured by mixing the materials shown in the table 2 with the proportion (vol %) shown in the comparative example column of the table 2 were set together to obtain the friction couple of the comparative example. Differing from the second friction member of the fifth embodiment, the second friction member of the comparative example did not include tin as an oxidation film-developing medium, which is one of the features of the present invention. The processes of mixing and thermoforming of the brake pad materials were carried out in the same way as the brake pad of the fifth embodiment.

TABLE 2

| Material | Component | Proportion Embodiment | Comparative Example |
|---|---|---|---|
| Fiber Base Material | Aramid Fiber | 5 | 5 |
|  | Steel Fiber | 5 | 10 |
|  | Tin | 5 | 0 |
|  | Glass Fiber | 0 | 10 |
| Friction Modifier and Filler | Graphite | 5 | 5 |
|  | ZrSiO$_4$ | 10 | 10 |
|  | Mica | 10 | 10 |
|  | Barium Sulfate | 40 | 30 |
| Binder | Phenolic Resin | 20 | 20 |
| Total |  | 100 | 100 |

2. Measurement and Evaluation of Friction Characteristics of the Friction Couple The test pieces of friction couples of the fifth embodiment and the comparative example were rubbed together for one hour at the speed of 1 m/s, with a load of 200N, at the temperature of 100° C. or 300° C. Then, the speed is reduced from 1 m/s to 0 m/s. The table 3 shows friction coefficients (μ), variation of the friction coefficients during braking (Δμ), and amounts of wear before and after the braking.

TABLE 3

|  | Embodiment | Comparative Example |
|---|---|---|
| Friction Coefficient (μ)/100° C. | 0.63 | 0.40 |
| Friction Coefficient (μ)/300° C. | 0.65 | 0.37 |
| Δμ/100° C. | 0.02 | 0.07 |
| Δμ/300° C. | 0.03 | 0.1 |
| Wear Amount/100° C. | 0.2 mm | 1 mm |
| Wear Amount/300° C. | 0.5 mm | 3 mm |

As shown in the table 3, the friction couple of the fifth embodiment exhibited higher friction coefficient μ, smaller friction variation amount Δμ, and smaller wear amount than the friction couple of the comparative example at both temperatures of 100° C. and 300° C. That is, the friction couple of the first aspect of the present invention is more effective than the friction couple of the related art.

What is claimed is:

1. A friction couple comprising:
a first friction member that contains a metallic material and includes a first friction surface; and
a second friction member that includes a second friction surface that contacts the first friction surface and that contains an oxide film developer that accelerates formation of an oxide film on the first friction surface and the second friction surface by oxidizing the metallic material when the first friction surface and the second friction surface contact each other.

2. The friction couple according to claim 1, wherein the metallic material is iron or an iron compound.

3. The friction couple according to claim 1, wherein the second friction member contains, as the oxide film developer, at least one of a single metallic element and a metallic compound that are less likely oxidized than the metallic material.

4. The friction couple according to claim 3, wherein the single metallic element is at least one of tin, cobalt, indium, iridium, silver, bismuth, gold, platinum, rhodium, and palladium.

5. The friction couple according to claim 3, wherein the metallic compound contains at least one of tin, cobalt, indium, iridium, silver, bismuth, gold, platinum, rhodium, and palladium.

6. The friction couple according to claim 1, wherein the second friction member contains, as the oxide film developer, two or more metallic oxides that contain same metallic atoms whose oxidation numbers are different.

7. The friction couple according to claim 1, wherein the second friction member contains at least one of α—Fe$_2$O$_3$ and Fe$_3$O$_4$ as the oxide film developer.

8. The friction couple according to claim 1, wherein the second friction member contains α—Fe$_2$O$_3$ and Fe$_3$O$_4$ as the oxide film developer.

9. The friction couple according to claim 1, wherein the metallic material is iron or a iron compound, and the second friction member contains, as the oxide film developer, a substance that has a stronger tendency to be negatively charged than iron.

10. The friction couple according to claim 9, wherein the substance that has a stronger tendency to be negatively charged than iron is at least one of platinum, silicon, silver, sulfur, polyethylene, polypropylene, polyurethane, rayon, polyester, and vinyl resin.

11. The friction couple according to claim 1, wherein the second friction member contains, as the oxide film developer, a substance that acts as an oxidation catalyst by friction.

12. The friction couple according to claim 11, wherein the second friction member contains, as the substance that acts as the oxidation catalyst by friction, at least one of TiO$_2$, BaTiO$_3$, ZrO$_2$, and p-type semiconductor.

13. The friction couple according to claim 6, wherein a proportion between the metallic atoms with different oxidation numbers is a fixed value regardless of an oxidation state and a reduction state.

14. A friction couple comprising:
a first friction member that contains a metallic material and includes a first friction surface; and
a second friction member that includes a second friction surface that contacts the first friction surface and that contains an oxide film developer that accelerates formation of an oxide film on at least one of the first friction surface and a second friction surface by oxidizing the metallic material when the first friction surface and the second friction surface contact each other,
the second friction member contains, as the oxide film developer, a substance that acts as an oxidation catalyst by friction, and
the second friction member contains, as the substance that acts as the oxidation catalyst by friction, at least one of TiO$_2$, BaTiO$_3$, ZrO$_2$, and p-type semiconductor.

* * * * *